United States Patent
Chu (10) Patent No.: US 10,774,980 B2
(45) Date of Patent: Sep. 15, 2020

(54) AUDIO-VISUAL ADJUSTMENT DEVICE AND METHOD FOR CONTROLLING THE SAME

(71) Applicant: BOE TECHNOLOGY GROUP CO., LTD., Beijing (CN)

(72) Inventor: Xiao Chu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/043,367

(22) Filed: Jul. 24, 2018

(65) Prior Publication Data
US 2019/0093817 A1   Mar. 28, 2019

(30) Foreign Application Priority Data
Sep. 27, 2017   (CN) .......................... 2017 1 0892380

(51) Int. Cl.
*F16M 11/14* (2006.01)
*F16M 11/18* (2006.01)
(Continued)

(52) U.S. Cl.
CPC .............. *F16M 11/14* (2013.01); *F16M 11/10* (2013.01); *F16M 11/18* (2013.01);
(Continued)

(58) Field of Classification Search
CPC .... F16M 11/14; F16M 11/2021; F16M 11/10; F16M 11/18; H04N 5/655; H04N 5/64;
(Continued)

(56) References Cited

U.S. PATENT DOCUMENTS

| 7,490,887 | B2 * | 2/2009 | Vitito ..................... | B60K 35/00 296/37.8 |
| 8,243,428 | B2 * | 8/2012 | Fu ......................... | F16M 11/10 248/917 |
| 2007/0181755 | A1 * | 8/2007 | Oh ........................ | F16M 11/10 248/176.1 |
| 2007/0202858 | A1 * | 8/2007 | Yu ........................ | H04M 1/605 455/414.1 |

(Continued)

FOREIGN PATENT DOCUMENTS

| CN | 103543828 A | 1/2014 |
| CN | 103699138 A | 4/2014 |

(Continued)

OTHER PUBLICATIONS

First Office Action for Chinese Application No. 201710892380.8, dated Feb. 3, 2020, 11 Pages.

*Primary Examiner* — Muhammad Ijaz
(74) *Attorney, Agent, or Firm* — Brooks Kushman P.C.

(57) ABSTRACT

An audio-visual adjustment device includes an adjustment mechanism, a detection circuit, a control circuit and a driver. The detection circuit, the control circuit and the driver are disposed on the adjustment mechanism. The adjustment mechanism is used to clamp and adjust an audio-visual device. The detection circuit is used to detect a target object and obtain description information of the target object. The control circuit is used to determine an adjustment angle of the audio-visual device based on the description information of the target object and current position information of the audio-visual device. The driver is used to drive the adjustment mechanism to adjust at least one of a position and an angle of the audio-visual device based on the adjustment angle, thereby enabling the audio-visual device to be oriented towards the target object.

12 Claims, 4 Drawing Sheets

(51) Int. Cl.
*G06F 3/16* (2006.01)
*G06T 7/73* (2017.01)
*G06K 9/00* (2006.01)
*G06K 9/32* (2006.01)
*F16M 11/10* (2006.01)
*H04N 5/64* (2006.01)
*H04N 5/655* (2006.01)
*F16M 11/20* (2006.01)

(52) U.S. Cl.
CPC ......... *F16M 11/2021* (2013.01); *G06F 3/165* (2013.01); *G06K 9/00228* (2013.01); *G06K 9/00288* (2013.01); *G06K 9/3216* (2013.01); *G06T 7/73* (2017.01); *H04N 5/64* (2013.01); *H04N 5/655* (2013.01)

(58) Field of Classification Search
CPC ............ G06K 9/3216; G06K 9/00228; G06K 9/00288; G06T 7/73; G06F 3/165; G06F 3/011
USPC ....................................... 248/917–924, 372.1
See application file for complete search history.

(56) References Cited

U.S. PATENT DOCUMENTS

| | | | |
|---|---|---|---|
| 2008/0093528 A1* | 4/2008 | Tsai | F16M 11/08 248/349.1 |
| 2009/0084913 A1* | 4/2009 | Grabania | F16M 11/08 248/176.3 |
| 2011/0294579 A1* | 12/2011 | Marks | H04N 13/10 463/36 |
| 2012/0229300 A1* | 9/2012 | Fu | B60R 11/02 340/901 |
| 2016/0035310 A1 | 2/2016 | Song et al. | |
| 2016/0299574 A1 | 10/2016 | Chen | |

FOREIGN PATENT DOCUMENTS

| | | | |
|---|---|---|---|
| CN | 104238923 A | | 12/2014 |
| CN | 104699231 A | * | 6/2015 |
| CN | 104699231 A | | 6/2015 |
| CN | 105376621 A | | 3/2016 |
| CN | 105607733 A | | 5/2016 |
| CN | 106603945 A | | 4/2017 |
| TW | 200731743 A | | 8/2007 |

* cited by examiner

AUDIO-VISUAL ADJUSTMENT DEVICE AND METHOD FOR CONTROLLING THE SAME

CROSS-REFERENCE TO RELATED APPLICATION

This application claims priority to Chinese Patent Application No. 201710892380.8, filed on Sep. 27, 2017, which is incorporated herein by reference in its entirety.

TECHNICAL FIELD

The present disclosure relates to the field of communication technology, and in particular to an audio-visual adjustment device and a method for adjusting the same.

BACKGROUND

With development of technologies, the popularity of mobile terminals such as mobile phones and tablet computers is becoming higher. People not only use the mobile terminals to communicate in their work and life, but also use the mobile terminals for entertainment, such as listening to music, watching videos, etc. When using one mobile terminal, one user may do other things while using the mobile terminal, for example, the user may watch the video or listen to audio while cleaning. In this case, the user may often encounter the following problems that when the user walks in a room, the user cannot see the video at some angles as the mobile terminal cannot automatically adjust its direction. When a distance between the user and the mobile terminal becomes far, the user may not hear the sound of video or audio and then the user needs to manually adjust or pause the playback.

SUMMARY

One embodiment of the present disclosure provides an audio-visual adjustment device which includes an adjustment mechanism, a detection circuit, a control circuit and a driver. The detection circuit, the control circuit and the driver are connected with the adjustment mechanism. The adjustment mechanism is used to clamp and adjust an audio-visual device. The detection circuit is used to detect a target object and obtain description information of the target object. The control circuit is used to determine an adjustment angle of the audio-visual device based on the description information of the target object and current position information of the audio-visual device. The driver is used to drive the adjustment mechanism to adjust at least one of a position and an angle of the audio-visual device based on the adjustment angle, thereby enabling the audio-visual device to be oriented towards the target object.

Optionally, the adjustment mechanism includes a base, a first pivot portion mounted to the base, a main shaft, a second pivot portion and a retaining clamp. The main shaft is disposed between the first pivot portion and the second pivot portion, and is connected with both of the first pivot portion and the second pivot portion; the retaining clamp is mounted to the second pivot portion and is configured to hold the audio-visual device. The first pivot portion is configured to adjust a rotation angle of the main shaft; and the second pivot portion is configured to adjust a rotation angle of the retaining clamp.

Optionally, the detection circuit includes a first sensing device on the adjustment mechanism and a second sensing device spaced from the first sensing device. The detection circuit is configured to, in response to that the first sensing device senses the second sensing device mounted on the target object, determine position information of the second sensing device and take the position information of the second sensing device as the description information of the target object. The control circuit is configured to, based on the position information of the second sensing device, position information of the first pivot portion and position information of the second pivot portion, determine an adjustment angle of the first pivot portion and an adjustment angle of the second pivot portion.

Optionally, the detection circuit is configured to obtain a facial image of the target object, identify at least one of a deflection angle of the target object and position information of the target object according to the facial image, and take at least one of the deflection angle of the target object and position information of the target object as the description information of the target object. The control circuit is configured to, based on the description information of the target object, position information of the first pivot portion and position information of the second pivot portion, determine an adjustment angle of the first pivot portion and an adjustment angle of the second pivot portion.

Optionally, the detection circuit includes a camera mounted on the adjustment mechanism.

Optionally, the audio-visual adjustment device is communicated with the audio-visual device. The control circuit is further configured to determine a distance between the target object and the audio-visual device according to the description information of the target object and the current position information of the audio-visual device, determine a play volume of the audio-visual device according to the distance between the target object and the audio-visual device, and send an instruction for adjusting play volume to the audio-visual device.

Optionally, the retaining clamp is provided with a data cable and a BLUETOOTH component.

One embodiment of the present disclosure further provides a method for controlling the above audio-visual adjustment device. The method includes: detecting a target object and obtaining description information of the target object; determining an adjustment angle of the audio-visual device based on the description information of the target object and current position information of the audio-visual device; and driving the adjustment mechanism to adjust at least one of a position and an angle of the audio-visual device based on the adjustment angle, thereby enabling the audio-visual device to be oriented towards the target object.

Optionally, the adjustment mechanism includes a base, a first pivot portion mounted to the base, a main shaft, a second pivot portion and a retaining clamp; the main shaft is disposed between the first pivot portion and the second pivot portion, and is connected with both of the first pivot portion and the second pivot portion; the retaining clamp is mounted to the second pivot portion and is configured to hold the audio-visual device. The driving the adjustment mechanism to adjust at least one of a position and an angle of the audio-visual device based on the adjustment angle includes: adjusting a rotation angle of the main shaft with the first pivot portion, and adjusting a rotation angle of the retaining clamp with the second pivot portion.

Optionally, the adjustment mechanism is provided with a first sensing device and a second sensing device is mounted on the target object; the detecting a target object and obtaining description information of the target object includes: in response to that the first sensing device senses the second sensing device, determining position information of the second sensing device and taking the position information of the second sensing device as the description information of the target object. The determining an adjustment angle of the audio-visual device based on the description information of the target object and current position information of the audio-visual device, includes: determining an adjustment angle of the first pivot portion and an adjustment angle of the second pivot portion, based on the position information of the second sensing device, position information of the first pivot portion and position information of the second pivot portion.

Optionally, the detecting a target object and obtaining description information of the target object includes: obtaining a facial image of the target object; and identifying at least one of a deflection angle of the target object and position information of the target object according to the facial image, and taking at least one of the deflection angle of the target object and the position information of the target object as the description information of the target object.

Optionally, the obtaining a facial image of the target object includes: obtaining the facial image of the target object by means of a camera of the audio-visual device or a camera mounted on the adjustment mechanism.

Optionally, the method further includes: establishing communication between the audio-visual adjustment device and the audio-visual device; determining a play volume of the audio-visual device according to the description information of the target object and the current position information of the audio-visual device; and sending, by the audio-visual adjustment device, an instruction for adjusting play volume to the audio-visual device.

Optionally, the establishing communication between the audio-visual adjustment device and the audio-visual device includes: establishing communication between the audio-visual adjustment device and the audio-visual device by means of a data cable provided at the retaining clamp or a BLUETOOTH component.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Figure 1:
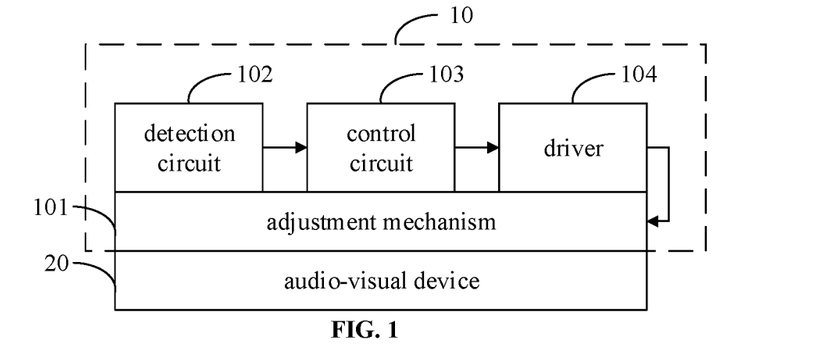
FIG. 1 is a schematic diagram of an audio-visual adjustment device according to an exemplary embodiment of the present disclosure.

FIG. 1 is a schematic diagram of an audio-visual adjustment device 10 according to an exemplary embodiment of the present disclosure. Referring to FIG. 1, the audio-visual adjustment device 10 includes an adjustment mechanism 101, a detection circuit 102, a control circuit 103 and a driver 104. The detection circuit 102, the control circuit 103 and the driver 104, for example, may be disposed on the adjustment mechanism 101.

The adjustment mechanism 101 is used to clamp and adjust an audio-visual device 20.

The detection circuit 102 is used to detect a target object and obtain description information of the target object.

The control circuit 103 is used to, based on the description information of the target object and current position information of the audio-visual device 20, determine an adjustment angle of the audio-visual device.

The driver 104 is used to, based on the adjustment angle, drive the adjustment mechanism 101 to adjust a position and/or an angle of the audio-visual device 20, thereby enabling the audio-visual device 20 to be oriented towards the target object.

In some embodiments, the audio-visual device 20 may be a device that can play video and audio, such as a mobile phone, PAD and MP4, which are not specifically limited and may be set according to actual needs.

The adjustment mechanism 101 of the audio-visual adjustment device 10 can clamp the audio-visual device 20 and may mount the audio-visual device 20 to a position specified by a user. For example, the adjustment mechanism 101 may mount the audio-visual device 20 such as a mobile phone to a kitchen wall or a windowsill; meanwhile, the adjustment mechanism 101 can adjust the audio-visual device 20. In this way, when the user moves from one end of a kitchen to another end of the kitchen, the adjustment mechanism 101 can adjust an angle of the mobile phone, thereby enabling the mobile phone to be oriented towards the user and then facilitating the user to view the mobile phone. In some embodiments, when a position of the user relative to the mobile phone is changed, under control of the driver 104, the adjustment mechanism 101 can automatically adjust the angle of the mobile phone, thereby enabling the mobile phone to be oriented towards the user all the time and then facilitating the user to view the mobile phone.

The detection circuit 102, the control circuit 103 and the driver 104 of the audio-visual adjustment device 10 may be connected with the adjustment mechanism 101, respectively. Specifically, the detection circuit 102, the control circuit 103 and the driver 104 may be disposed on the adjustment mechanism 101.

The detection circuit 102 may detect the target object and obtain the description information of the target object. For example, the detection circuit 102 may detect a target object A in the kitchen and obtain description information of the target object A. The description information of the target object A includes an orientation of the target object A and a distance between the target object A and the audio-visual device 20 and so on. The description information is not specifically limited and may be set according to actual needs. The detection circuit 102 may send the obtained description information to the control circuit 103.

The control circuit 103 may determine an adjustment angle of the audio-visual device 20 based on the description information and a current position of the audio-visual device 20. For example, when the target object A moves from a position where the target object A directly faces the audio-visual device 20 to another end of the kitchen, the control circuit 103 may determine that an angle between the audio-visual device 20 and the target object A is changed from 90 degrees to 45 degrees. The control circuit 103 may send the determined adjustment angle to the driver 104. The driver 104 drives the adjustment mechanism 101 to adjust its angle, thereby enabling the audio-visual device 20 to be oriented towards the target object again, i.e., enabling the target object A to directly face the audio-visual device 20 again. In some embodiments, the control circuit 103 may employ processor, and the driver 104 may employ a motor or a hydraulic driving device.

In some embodiments, the angle between the audio-visual device 20 and the target object A refers to an angle defined between a line defined by connecting a position where the target object A is to a center of the audio-visual device 20, and a plane where the audio-visual device 20 is. Here, in some embodiments, when the target object A directly face the audio-visual device 20, the line defined by connecting the position where the target object A is to the center of the audio-visual device 20, is perpendicular to the plane where the audio-visual device 20 is.

Figure 2:
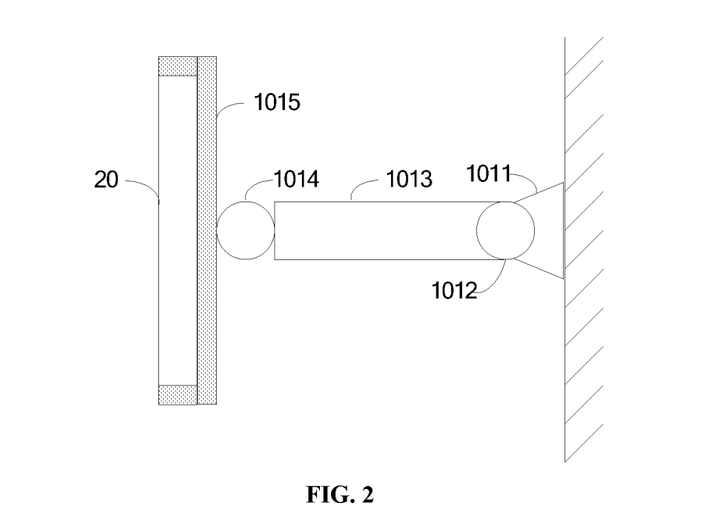
FIG. 2 is a schematic view of an adjustment mechanism according to an exemplary embodiment of the present disclosure.

In some embodiments, as shown in FIG. 2, the adjustment mechanism 101 includes a base 1011, a first pivot portion 1012 mounted to the base 1011, a main shaft 1013, a second pivot portion 1104 and a retaining clamp 1015. The main shaft 1013 is disposed between the first pivot portion 1012 and the second pivot portion 1014, and is connected with both of the first pivot portion 1012 and the second pivot portion 1014. The retaining clamp 1015 is mounted to the second pivot portion 1014 and is used to hold the audio-visual device 20. In other words, two ends of the main shaft 1013 are rotatably connected with the base 1011 and the retaining clamp 105 by the first pivot portion 1012 and the second pivot portion 1014, respectively.

Specifically, the first pivot portion 1012 is used to adjust a rotation angle of the main shaft 1013. The second pivot portion 1014 is used to adjust a rotation angle of the retaining clamp 1015. In one embodiment, when the driver 104 may employ a motor and a shaft of the motor may be in a transmission connection with the first pivot portion 1012 and the second pivot portion 1014, respectively, so that the first pivot portion 1012 and the second pivot portion 1014 can be independently controlled to rotate. In other embodiments, the driver 104 may employ two motors, and the two motors may be coupled to the first pivot portion 1012 and the second pivot portion 1014, respectively.

Figure 3A:
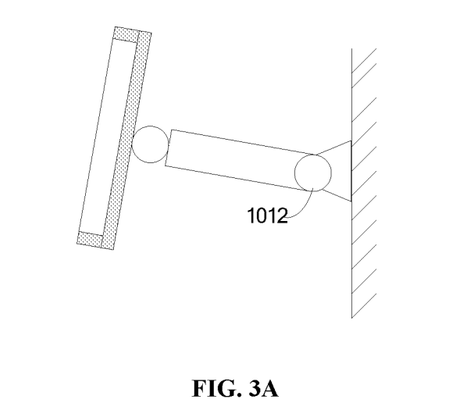
FIGS. 3A and 3B are schematic views showing rotation angles of a main shaft according to an exemplary embodiment of the present disclosure.
Figure 3B:
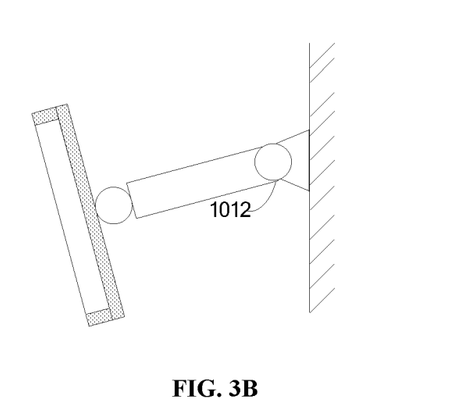
Figure 4A:
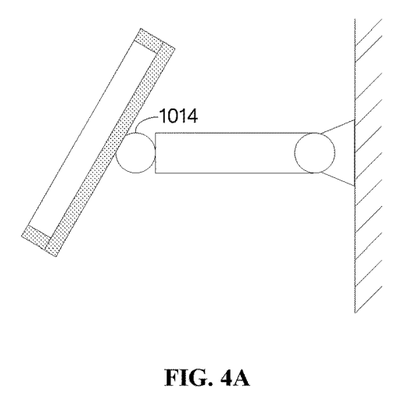
FIGS. 4A and 4B are schematic views showing rotation angles of a retaining clamp according to an exemplary embodiment of the present disclosure.
Figure 4B:
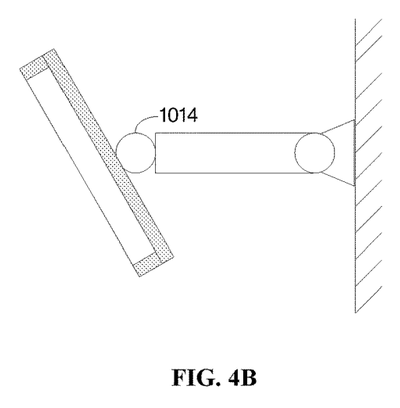

In this embodiment, the base 1011 is used to mount the adjustment mechanism 101 to a position specified by the user by means of adhesive or adsorption. The first pivot portion 1012 can adjust the rotation angle of the main shaft 1013, for example, FIGS. 3A and 3B show different rotation angles of the main shaft relative to the base 1011. The second pivot portion 1014 can adjust the rotation angle of the retaining clamp 1015, for example, s FIGS. 4A and 4B show different rotation angles of the retaining clamp relative to the main shaft. Ranges of rotation angles are not specifically limited and may be set according to actual needs.

Figure 5:
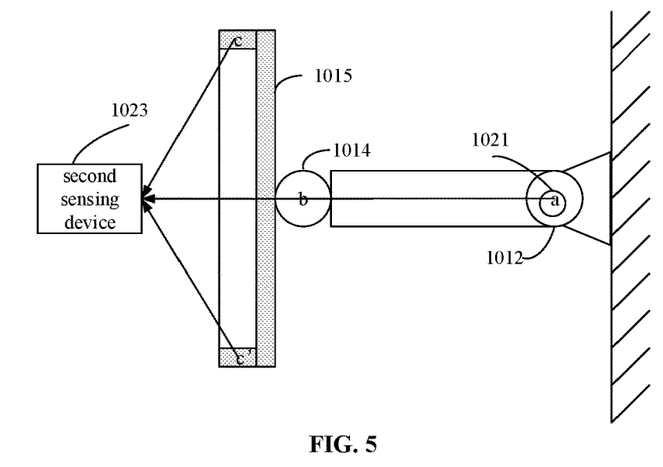
FIG. 5 is a schematic view showing positions of a sensing device according to an exemplary embodiment of the present disclosure.

In some embodiments, as shown in FIG. 5, the detection circuit 102 includes a first sensing device 1021 on the adjustment mechanism 101 and a second sensing device 1023 spaced from the first sensing device 1021. The second sensing device 1023 may be disposed on the target object.

The detection circuit 102 is used to, when the first sensing device senses the second sensing device, determine position information of the second sensing device and take the position information of the second sensing device as the description information of the target object.

The control circuit 103 is used to, based on the position information of the second sensing device, position information of the first pivot portion 1012 and position information of the second pivot portion 1014, determine an adjustment angle of the first pivot portion 1012 and an adjustment angle of the second pivot portion 1014.

In this embodiment, as shown in FIG. 5, the first sensing device 1021 may be disposed at the point a of the first pivot portion 1012, the point b of the second pivot portion 1104 and the points c and c' of the retaining clamp 1015. The control circuit 103 may determine a rotation angle of the main shaft 1013 based on position information of the points a, b and the second sensing device. Meanwhile, the control circuit 103 may determine a rotation angle of the retaining clamp 1015 based on position information of the points c, c' and the second sensing device. The second sensing device may be formed in form of earphones or accessories, and may be disposed on the target object, which are not specifically limited herein and may be set according to actual situation.

In some optional embodiments of the present disclosure, the detection circuit 102 is used to obtain a facial image of the target object, and identify a deflection angle of the target object and/or position information of the target object according to the facial image. Further, the detection circuit 102 takes the deflection angle of the target object and/or position information of the target object as the description information of the target object.

In this embodiment, the detection circuit 102 may obtain the facial image of the target object by means of a camera of audio-visual device 20 or a camera mounted on the adjustment mechanism 101, which are not specifically limited and may be set according to actual situations. After the detection circuit 102 obtains the facial image, the detection circuit 102 identifies the deflection angle of the target object and/or position information of the target object by performing face recognition, which may be refer to related technologies and will not be elaborated herein.

As described above, in some embodiments of the present disclosure, the audio-visual adjustment device includes the adjustment mechanism, the detection circuit, the control circuit and the driver, and the detection circuit, the control circuit and the driver may be disposed on the adjustment mechanism; the adjustment mechanism is used to clamp and adjust the audio-visual device; the detection circuit is used to detect the target object and obtain description information of the target object; the control circuit is used to determine the adjustment angle of the audio-visual device based on the description information of the target object and current position information of the audio-visual device; the driver is used to drive the adjustment mechanism to adjust a position and/or an angle of the audio-visual device based on the adjustment angle, thereby enabling the audio-visual device to be oriented towards the target object.

The audio-visual adjustment device of some embodiments of the present disclosure can automatically adjust orientation of the audio-visual device 20 to suit the user's viewing angle, thereby enabling the users to watch videos or listen to audio while doing things and then improving the user's experience.

On basis of the above embodiment, the audio-visual adjustment device 10 may be communicated with the audio-visual device 20.

The control circuit 103 may further be used to determine a play volume of the audio-visual device 20 according to the description information of the target object and the current position information of the audio-visual device 20.

In this embodiment, the audio-visual adjustment device 10 can implement functions of the above embodiment, and may be in communication with the audio-visual device 20. For example, the audio-visual adjustment device 10 may be communicated with the audio-visual device 20 by means of a data cable disposed at the retaining clamp 1015 or a BLUETOOTH device, which are not specifically limited and may be set according to actual situations. The control circuit 103 may determine the play volume of the audio-visual device 20 according to the description information of the target object and the current position information of the audio-visual device 20. For example, when a distance between one target object A and the audio-visual device 20 such as a mobile phone increases, the control circuit 103 may send an instruction to the mobile phone, thereby increasing the play volume of the mobile phone. In addition, when the description information is that the target object A is not within a detection range, the control circuit 103 may send an instruction to the mobile phone to enable the mobile phone to be paused or turned off. The play volume of the audio-visual device 20 may be determined according to actual situations, which are not specifically limited herein. In this way, the control circuit 103 can dynamically adjust orientation and volume of the audio-visual device 20 according to position change such as distance change between the target object A and the audio-visual device 20, thereby enabling the audio-visual device 20 to be oriented towards the user all the time and allowing the user to hear approximately the same volume at different locations and then greatly improving the user's experience.

As described above, in some embodiments of the present disclosure, the audio-visual adjustment device includes the adjustment mechanism, the detection circuit, the control circuit and the driver, and the detection circuit, the control circuit and the driver may be disposed on the adjustment mechanism; the adjustment mechanism is used to clamp and adjust the audio-visual device; the detection circuit is used to detect the target object and obtain description information of the target object; the control circuit is used to determine the play volume of the audio-visual device according to the description information of the target object and the current position information of the audio-visual device, and thus the user does not have to stop business in the hands to adjust the play volume of the audio-visual device, thereby greatly improving the user's experience.

Figure 6:
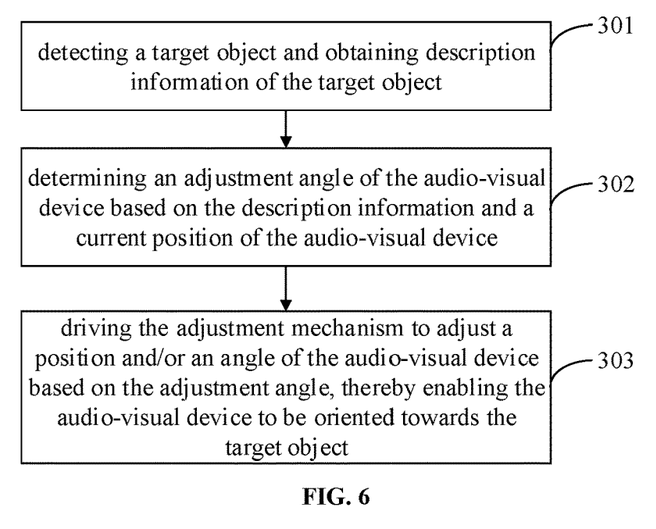
FIG. 6 is a flowchart of a method for controlling an audio-visual adjustment device according to an exemplary embodiment of the present disclosure.

FIG. 6 is a flowchart of a method for controlling an audio-visual adjustment device according to an exemplary embodiment of the present disclosure. This method may be applied to the above audio-visual adjustment device. As described above, the audio-visual adjustment device includes an adjustment mechanism that is used to clamp and adjust an audio-visual device. The adjustment mechanism may be of a variety of forms. Optionally, the adjustment mechanism 101 may include a base 1011, a first pivot portion 1012 mounted to the base 1011, a main shaft 1013, a second pivot portion 1104 and a retaining clamp 1015. The main shaft 1013 is disposed between the first pivot portion 1012 and the second pivot portion 1014, and is connected with both of the first pivot portion 1012 and the second pivot portion 1014. The retaining clamp 1015 is mounted to the second pivot portion 1014 and is used to hold the audio-visual device 20. The first pivot portion 1012 is used to adjust a rotation angle of the main shaft 1013. The second pivot portion 1014 is used to adjust a rotation angle of the retaining clamp 1015. As shown in FIG. 6, the method includes the following steps 301 to 303.

The step 301 is to detect a target object and obtain description information of the target object.

In this embodiment, the audio-visual adjustment device may be used to detect the target object and obtain description information of the target object.

In some embodiments, the audio-visual adjustment device may detect the target object and obtain description information of the target object in following ways.

First Way

As shown in FIG. 5, a first sensing device 1021 may be disposed on the adjustment mechanism 101 and a second sensing device 1023 may be disposed on the target object. After the first sensing device 1021 senses the second sensing device 1023, position information of the second sensing device 1023 is determined and is taken as the description information of the target object.

In this embodiment, the first sensing device 1021 may be disposed at the point a of the first pivot portion 1012, the point b of the second pivot portion 1104 and the points c and c' of the retaining clamp 1015. After the first sensing device 1021 senses the second sensing device 1023, a position relationship between the audio-visual device 20 and the target object in the vertical direction is determined according to position information of the points a, b and the second sensing device. A position relationship between the audio-visual device 20 and the target object in the horizontal direction is determined according to position information of the points c, c' and the second sensing device. The position relationship between the audio-visual device 20 and the target object in the vertical direction and the position relationship between the audio-visual device 20 and the target object in the horizontal direction are taken as the description information of the target object.

Second Way

The facial image of the target object is obtained. The deflection angle of the target object and/or position information of the target object are identified according to the facial image. The deflection angle of the target object and/or position information of the target object are taken as the description information of the target object.

In this embodiment, the facial image of the target object may be obtained by means of a camera of audio-visual device 20 or a camera mounted on the adjustment mechanism 101. The deflection angle of the target object and/or position information of the target object may be determined by means of the image recognition technology.

The step 302 is to determine an adjustment angle of the audio-visual device based on the description information and a current position of the audio-visual device.

In this embodiment, optionally, an adjustment angle of the first pivot portion and an adjustment angle of the second pivot portion may be determined according to the position information of the second sensing device, the position information of the first pivot portion and the position information of the second pivot portion. For example, by taking the base 1011 as the origin of coordinate axes, when an angle defined between a negative direction of the Y-axis and a line connecting the point a and the second sensing device is 30 degrees, and an angle defined between a positive direction of the x axis and a line connecting the point b and the second sensing device is 60 degrees, then it is determined that a rotation angle of the first pivot portion 1012 is rotation downward about 30 degrees, and a rotation angle of the second pivot portion 1014 is to rotate right about 60 degrees.

The step 303 is to drive the adjustment mechanism to adjust a position and/or an angle of the audio-visual device based on the adjustment angle, thereby enabling the audio-visual device to be oriented towards the target object.

In this embodiment, after the adjustment angle is determined, the first pivot portion 1012 and the second pivot portion 1014 of the adjustment mechanism 101 are driven based on the adjustment angle, thereby adjusting orientation and/or angle of the audio-visual device 20 and then enabling the audio-visual device 20 to be oriented towards the target object.

As described above, in some embodiments of the present disclosure, the audio-visual adjustment device detects the target object and obtains description information of the target object, and then determines the adjustment angle of the audio-visual device based on the description information of the target object and current position information of the audio-visual device; the audio-visual adjustment device further drives the adjustment mechanism to adjust a position and/or an angle of the audio-visual device based on the adjustment angle, thereby enabling the audio-visual device to be oriented towards the target object. The method of some embodiments of the present disclosure can automatically adjust orientation of the audio-visual device to suit the user's viewing angle, thereby enabling the users to watch videos or listen to audio while doing things and then improving the user's experience.

Figure 7:
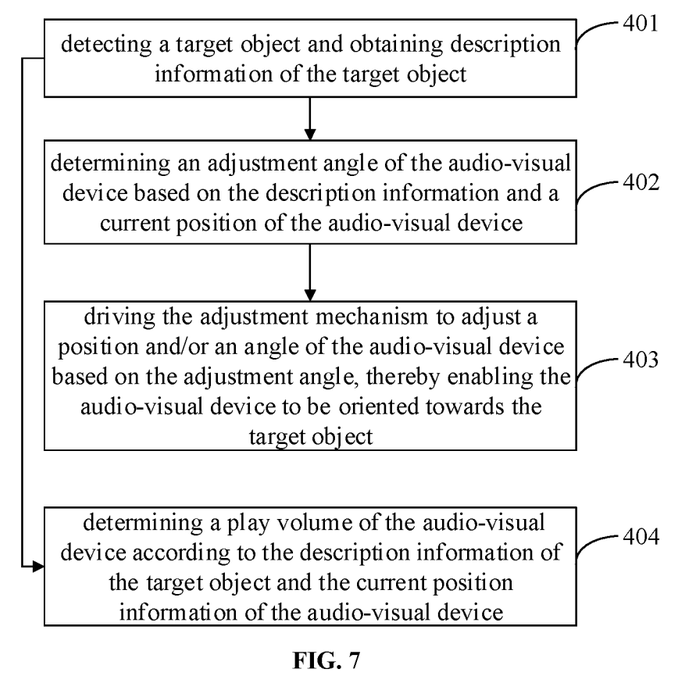
FIG. 7 is a flowchart of a method for controlling an audio-visual adjustment device according to an exemplary embodiment of the present disclosure.

FIG. 7 is a flowchart of a method for controlling an audio-visual adjustment device according to an exemplary embodiment of the present disclosure. The method may be applied to the above audio-visual adjustment device. The audio-visual adjustment device may communicate with the audio-visual device. Referring to FIG. 7, the method includes the following steps 401 to 404.

The step 401 is to detect a target object and obtain description information of the target object.

The step 402 is to determine an adjustment angle of the audio-visual device based on the description information of the target object and current position information of the audio-visual device.

The step 403 is to drive the adjustment mechanism to adjust a position and/or an angle of the audio-visual device based on the adjustment angle, thereby enabling the audio-visual device to be oriented towards the target object.

The step 404 is to determine a play volume of the audio-visual device according to the description information of the target object and the current position information of the audio-visual device.

In this embodiment, the audio-visual adjustment device 10 may communicate with the audio-visual device 20. For example, the audio-visual adjustment device 10 may communicate with the audio-visual device 20 by means of a data cable. The play volume of the audio-visual device may be determined according to the description information of the target object and current position information of the audio-visual device. For example, when a distance between one target object A and the audio-visual device 20 increases, and it is determined to increase the play volume of the audio-visual device 20, then the audio-visual adjustment device 10 may send an instruction for increasing play volume to the audio-visual device 20 through the data cable, thereby enabling the audio-visual device 20 to increase the play volume.

Figure 8:
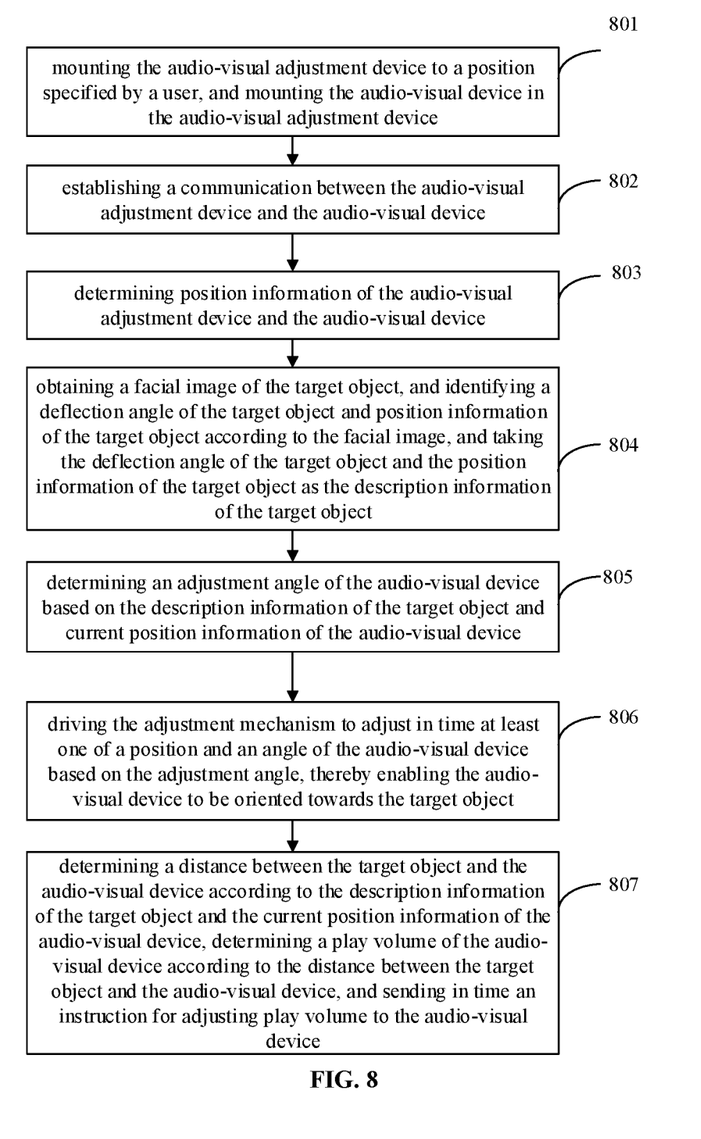
FIG. 8 is a flowchart of a method for controlling an audio-visual adjustment device according to an exemplary embodiment of the present disclosure.

FIG. 8 is a flowchart of a method for controlling an audio-visual adjustment device according to an exemplary embodiment of the present disclosure. The method may be applied to the above audio-visual adjustment device. The audio-visual adjustment device may communicate with the audio-visual device. Referring to FIG. 8, the method includes the following steps 801 to 807.

The step 801 is to mount the audio-visual adjustment device 10 to a position specified by a user, and mount the audio-visual device 20 in the audio-visual adjustment device 10.

In this step, the adjustment mechanism 101 of the audio-visual adjustment device 10 is first mounted to a kitchen wall or a windowsill, and then the audio-visual device 20 such as a mobile phone is mounted in the retaining clamp 1015 of the adjustment mechanism 101.

The step 802 is to establish a communication between the audio-visual adjustment device 10 and the audio-visual device 20.

In this step, the audio-visual adjustment device may establish communication with the audio-visual device by means of a data cable provided at the retaining clamp or a BLUETOOTH component.

The step 803 is to determine position information of the audio-visual adjustment device 10 and the audio-visual device 20.

In this step, the position information of the audio-visual adjustment device 10 and the audio-visual device 20 may be determined by means of a word coordinate calibration system.

The step 804 is to obtain a facial image of the target object, and identify a deflection angle of the target object and position information of the target object according to the facial image, and take the deflection angle of the target object and the position information of the target object as the description information of the target object.

In this step, the facial image of the target object may be obtained by means of a camera of the audio-visual device or a camera mounted on the adjustment mechanism. After obtaining the facial image, the deflection angle of the target object and position information of the target object may be identified by performing face recognition, which may be refer to related technologies and will not be elaborated herein.

The step 805 is to determine an adjustment angle of the audio-visual device based on the description information of the target object and current position information of the audio-visual device.

The step 806 is to drive the adjustment mechanism to adjust in time at least one of a position and an angle of the audio-visual device based on the adjustment angle, thereby enabling the audio-visual device to be oriented towards the target object.

The step 807 is to determine a distance between the target object and the audio-visual device according to the description information of the target object and the current position information of the audio-visual device, determine a play volume of the audio-visual device according to the distance between the target object and the audio-visual device, and send in time an instruction for adjusting play volume to the audio-visual device.

In this step, a correspondence relationship between positions with different distance away from the audio-visual device and proper play volumes may be measured in advance, and a preset curve is obtained according to the correspondence relationship. When used, the play volume of the audio-visual device may be determined according to the distance between the target object and the audio-visual device and the preset curve. Further, when the distance between the target object and the audio-visual device exceeds a preset threshold, the audio-visual device may be controlled to be paused or turned off. When the distance between the target object and the audio-visual device does exceed the preset threshold, the play volume of the audio-visual device may be determined according to the distance between the target object and the audio-visual device and the preset curve, and the instruction for adjusting play volume may be sent in time to the audio-visual device.

As described above, in some embodiments of the present disclosure, the audio-visual adjustment device may determine the play volume of the audio-visual device according to the description information of the target object and the current position information of the audio-visual device, thus the user does not have to stop business in the hands to adjust the play volume of the audio-visual device, thereby greatly improving the user's experience.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

The above are merely the optional embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. An audio-visual adjustment device comprising:
an adjustment mechanism;
a detection circuit;
a control circuit; and
a driver;
wherein the detection circuit, the control circuit and the driver are connected with the adjustment mechanism; the adjustment mechanism is configured to clamp and adjust an audio-visual device; the detection circuit is configured to detect a target object and obtain description information of the target object;
the control circuit is configured to, based on the description information of the target object and current position information of the audio-visual device, determine an adjustment angle of the audio-visual device; and
the driver is configured to, based on the adjustment angle, drive the adjustment mechanism to adjust at least one of a position and an angle of the audio-visual device, thereby enabling the audio-visual device to be oriented towards the target object;
wherein the adjustment mechanism includes a base, a first pivot portion mounted to the base, a main shaft, a second pivot portion and a retaining clamp; the main shaft is disposed between the first pivot portion and the second pivot portion, and is connected with both of the first pivot portion and the second pivot portion; the retaining clamp is mounted to the second pivot portion and is configured to hold the audio-visual device; and the first pivot portion is configured to adjust a rotation angle of the main shaft and the second pivot portion is configured to adjust a rotation angle of the retaining clamp;
wherein the detection circuit includes a first sensing device on the adjustment mechanism and a second sensing device spaced from the first sensing device; the detection circuit is configured to, in response to that the first sensing device senses the second sensing device, determine position information of the second sensing device and take the position information of the second sensing device as the description information of the target object, wherein the second sensing device is configured to be mounted to the target object and the control circuit is configured to, based on the position information of the second sensing device, position information of the first pivot portion and position information of the second pivot portion, determine an adjustment angle of the first pivot portion and an adjustment angle of the second pivot portion.

2. The audio-visual adjustment device of claim 1, wherein the detection circuit is configured to obtain a facial image of the target object, identify at least one of a deflection angle of the target object and position information of the target object according to the facial image, and take at least one of the deflection angle of the target object and position information of the target object as the description information of the target object; and
the control circuit is configured to, based on the description information of the target object, position information of the first pivot portion and position information of the second pivot portion, determine the adjustment angle of the first pivot portion and the adjustment angle of the second pivot portion.

3. The audio-visual adjustment device of claim 2, wherein the detection circuit includes a camera mounted on the adjustment mechanism.

4. The audio-visual adjustment device of claim 1,
wherein the audio-visual adjustment device is configured to communicate with the audio-visual device; and
the control circuit is further configured to determine a distance between the target object and the audio-visual device according to the description information of the target object and the current position information of the audio-visual device, determine a play volume of the audio-visual device according to the distance between the target object and the audio-visual device, and send an instruction for adjusting play volume to the audio-visual device.

5. The audio-visual adjustment device of claim 4, wherein the retaining clamp is provided with a data cable.

6. A method for controlling an audio-visual adjustment device including an adjustment mechanism, a detection circuit, a control circuit, and a driver:

wherein the detection circuit, the control circuit and the driver are connected with the adjustment mechanism; the adjustment mechanism is configured to clamp and adjust an audio-visual device; the detection circuit is configured to detect a target object and obtain description information of the target object;

wherein the adjustment mechanism includes a base, a first pivot portion mounted to the base, a main shaft, a second pivot portion and a retaining clamp; the main shaft is disposed between the first pivot portion and the second pivot portion, and is connected with both of the first pivot portion and the second pivot portion; the retaining clamp is mounted to the second pivot portion and is configured to hold the audio-visual device; and the first pivot portion is configured to adjust a rotation angle of the main shaft; and the second pivot portion is configured to adjust a rotation angle of the retaining clamp;

wherein the detection circuit includes a first sensing device on the adjustment mechanism and a second sensing device spaced from the first sensing device; the detection circuit is configured to, in response to that the first sensing device senses the second sensing device, determine position information of the second sensing device and take the position information of the second sensing device as the description information of the target object, wherein the second sensing device is configured to be mounted to the target object; and the control circuit is configured to, based on the position information of the second sensing device, position information of the first pivot portion and position information of the second pivot portion, determine an adjustment angle of the first pivot portion and an adjustment angle of the second pivot portion;

the method comprising:

detecting the target object and obtaining description information of the target object;

determining an adjustment angle of the audio-visual device based on the description information of the target object and current position information of the audio-visual device; and driving the adjustment mechanism to adjust at least one of a position and an angle of the audio-visual device based on the adjustment angle, thereby enabling the audio-visual device to be oriented towards the target object.

7. The method of claim 6, wherein the driving the adjustment mechanism to adjust the at least one of the position and the angle of the audio-visual device based on the adjustment angle includes:

adjusting the rotation angle of the main shaft with the first pivot portion, and adjusting the rotation angle of the retaining clamp with the second pivot portion.

8. The method of claim 7, wherein the second sensing device is mounted on the target object;

the detecting the target object and obtaining description information of the target object includes: in response to that the first sensing device senses the second sensing device, determining position information of the second sensing device and taking the position information of the second sensing device as the description information of the target object;

the determining the adjustment angle of the audio-visual device based on the description information of the target object and current position information of the audio-visual device, includes: determining an adjustment angle of the first pivot portion and the adjustment angle of the second pivot portion, based on the position information of the second sensing device, position information of the first pivot portion and position information of the second pivot portion.

9. The method of claim 6, wherein the detecting the target object and obtaining description information of the target object includes:

obtaining a facial image of the target object; and identifying at least one of a deflection angle of the target object and position information of the target object according to the facial image, and taking at least one of the deflection angle of the target object and the position information of the target object as the description information of the target object.

10. The method of claim 9, wherein the obtaining the facial image of the target object includes: obtaining the facial image of the target object by means of a camera of the audio-visual device or a camera mounted on the adjustment mechanism.

11. The method of claim 6, further comprising:

establishing communication between the audio-visual adjustment device and the audio-visual device;

determining a play volume of the audio-visual device according to the description information of the target object and the current position information of the audio-visual device; and sending, by the audio-visual adjustment device, an instruction for adjusting play volume to the audio-visual device.

12. The method of claim 11, wherein the establishing communication between the audio-visual adjustment device and the audio-visual device includes:

establishing communication between the audio-visual adjustment device and the audio-visual device by means of a data cable provided at the retaining clamp.

* * * * *